R. W. CANFIELD.
PROCESS OF MANUFACTURING BLOWN GLASS ARTICLES AND BLANKS FOR USE IN SUCH PROCESS.
APPLICATION FILED OCT. 2, 1915.
1,235,008.
Patented July 31, 1917.
2 SHEETS—SHEET 2.
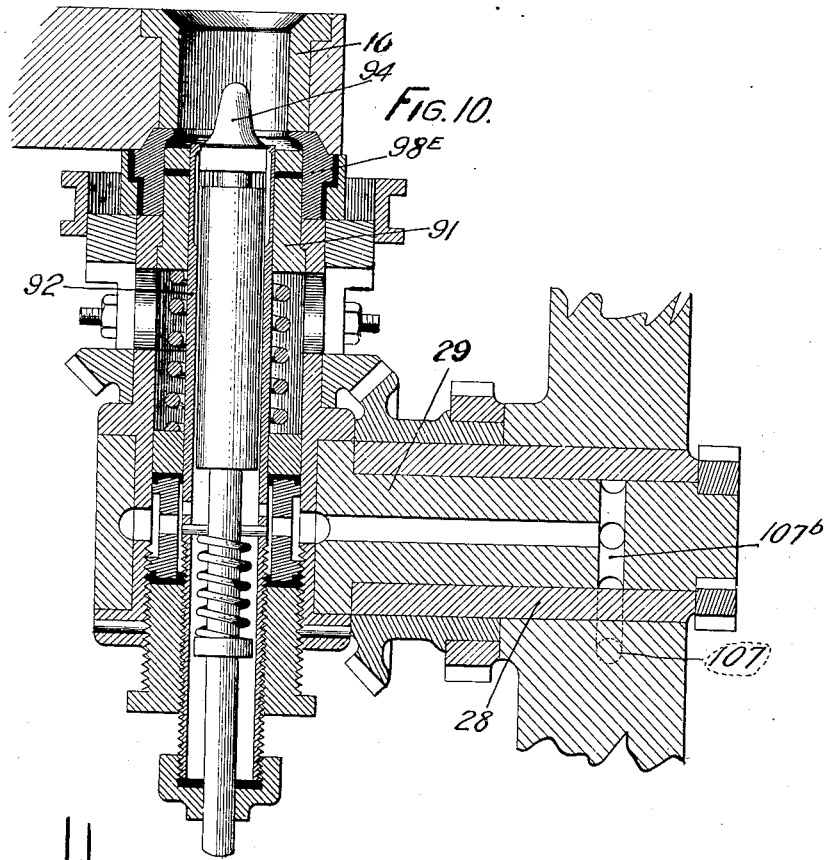
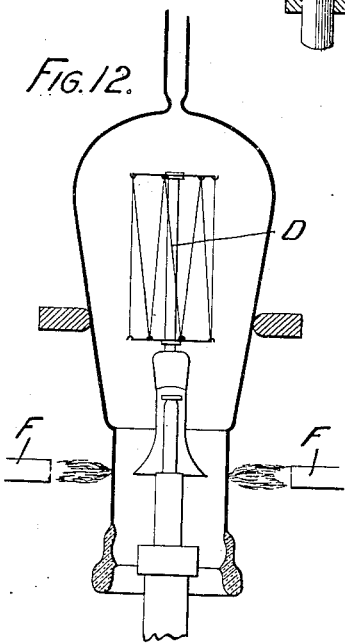
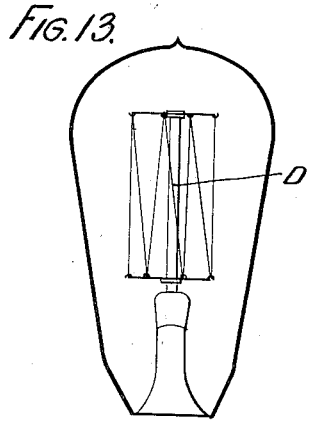
Inventor
Robert W Canfield
By
Attorney

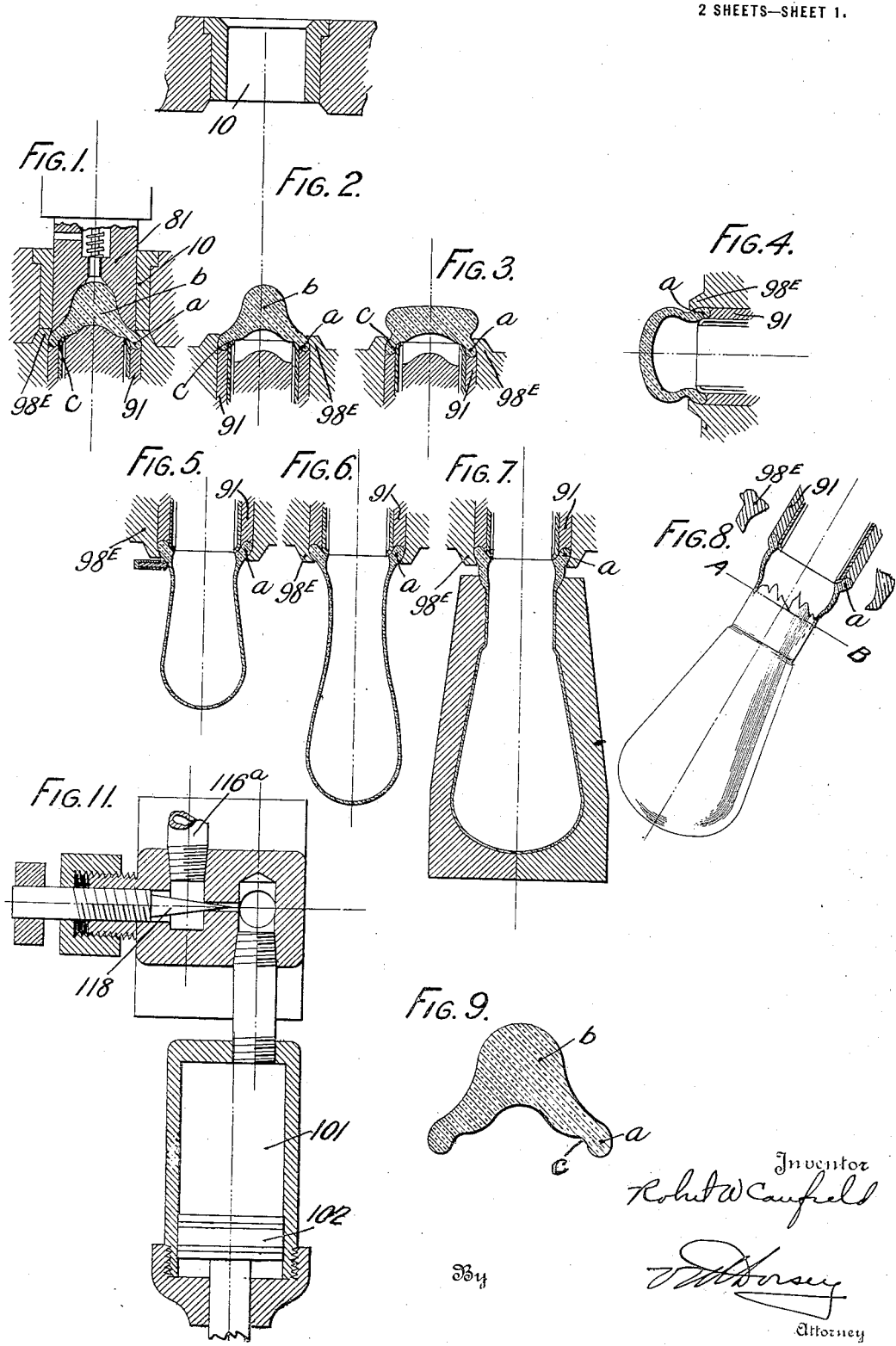

UNITED STATES PATENT OFFICE.

ROBERT W. CANFIELD, OF CORNING, NEW YORK, ASSIGNOR TO EMPIRE MACHINE COMPANY, A CORPORATION OF MAINE.

PROCESS OF MANUFACTURING BLOWN GLASS ARTICLES AND BLANKS FOR USE IN SUCH PROCESS.

1,235,008.  Specification of Letters Patent.  Patented July 31, 1917.

Application filed October 2, 1915. Serial No. 53,722.

*To all whom it may concern:*

Be it known that I, ROBERT W. CANFIELD, a citizen of the United States of America, and a resident of Corning, New York, have invented certain new and useful Improvements in Processes of Manufacturing Blown Glass Articles and Blanks for Use in Such Processes, of which the following is a specification.

Numerous attempts have heretofore been made looking to the production of hollow articles by what is known as the press-and-blow process. In this process, a more or less hollow blank is pressed from fluid glass, and such blank is subsequently expanded in a blowing mold by a fluid pressure in the hollow thereof. This process is advantageous because of the facility with which it can be carried out by mechanical appliances, but however successful it may have been in the production of coarser articles and those with thick walls, difficulties have been experienced with it in the production of the thin walled articles such as bulbs for electric lamps. These bulbs should not only be without flaws which will affect their subsequent working, but must also be without optical defects, and must have walls of uniform thickness. The uniformity necessary for these purposes is difficult to obtain, some of the causes for the lack thereof being as follows:

1. Improper distribution of the glass. This may arise either from, (*a*) an improper shape given to the blank, or to the distribution of glass therein, or (*b*) from improper handling of a properly formed blank.

2. Improper heat distribution in the blank, causing uneven expansion thereof and strain in the bulb. This may arise either (*a*) from the shape of the blank, (*i. e.*, unequal thickness of its walls), or from (*b*) unequal heat absorption by different zones of the press mold.

The proper shaping of the pressed blank is complicated by the fact that it is necessary to remove it from the press mold, in order to avoid excessive chilling of its surface and to permit its expansion in blowing, while it is still so hot as to tend to run, although it has been given a skin sufficiently hardened to form a sac, restraining the free flow of the fluid interior. In my application filed Aug. 25, 1914, Sr. No. 857,722 is described a process and a machine in which the blank, after removal from the press mold is held erect on the upper end of a rotating spindle while the skin heats by conduction from the hotter interior of the blank to give a proper heat graduation in the blank and to render the skin itself so plastic as to stretch without cracking, and in such process, as in any process in which an appreciable time elapses between the removal from the press mold, and the blowing, the blank tends to flow under gravity. Attempts have been made to neutralize this force, by rotating the blank and varying the position thereof, but without complete success. In the application before referred to, the blank is, after a proper period for reheating, moved around a horizontal axis (with a pause, if desired, and while the spindle is still rotating) until the blank hangs pendant from the now lower end of the spindle for elongation and blowing. In the first position, (*i. e.*, the position in which the blank is on the upper end of the spindle), the blank tends to settle down, and unless properly shaped, may do so asymmetrically, causing bad glass distribution, while the shape which is most advantageous in preventing this, is not necessarily the shape most desirable to provide for a proper heat distribution, or a proper shape to provide the glass distribution therein necessary to give proper wall thicknesses or expansion.

In the accompanying drawings which show various steps in the formation of an electric lamp bulb according to this invention,—

Figure 1 shows the pressing of a blank.

Fig. 2 shows the blank fully formed, and supported upon a glass-working spindle, all parts of the exterior of the blank which are to enter into the completed article being free from heat-conducting contact and heat-insulated by the air surrounding them.

Fig. 3 shows a blank in process of settling and reheating while erect.

Fig. 4 shows the blank supported horizontally and slightly expanded.

Figs. 5 and 6 show the blank in successive stages of elongation.

Fig. 7 shows the blank while being blown.

Fig. 8 shows the completed blank ready for removal from the spindle on which it is formed.

Fig. 9 is an enlarged view of the blank as pressed.

Fig. 10 is a view of the pressing parts and a glass spindle adapted to carry out the process described herein.

Fig. 11 is a sectional view illustrating the air supply.

Figs. 12 and 13 illustrate the manufacture of a lamp from the bulb shown in Fig. 8.

In carrying out my process, I first mold a blank from a mass of fluid or plastic glass. In Fig. 1 the molding is shown as taking place in a glass receiver 10 against the bottom of which fits a spindle mounted for rotation around its own axis and also around a horizontal axis formed by a trunnion 29, the end of the spindle against the bottom of the mold having thereon separable neck ring 98$^E$. Within the neck mold is resiliently mounted a follower ring 91, in the interior of which is the longitudinally adjustable sleeve 92 in which is the reciprocating plunger 94. These parts completely close in the lower end of the receiving mold 10, and glass inserted in the latter is pressed into shape by a cup-shaped press plunger 81. In so far as concerns certain aspects of my invention, it will be understood that the blank could as well be produced by any form of mold, such for instance as in a sucking mold. In any event, the result of the molding operation is to form a blank, consisting of a shaped mass of glass, the surface of which has been so chilled by contact with the mold parts as to form a sack sufficiently strong to contain the more fluid or plastic center. The permissible strength of such a skin will vary with the mass of the blank and the temperature of the interior thereof, the internal hydrostatic pressure on the skin being due to the weight of its fluid interior, and varying with the fluidity of the glass. To give this strength in the press mold to the skin will generally result in a skin too tough to stretch without cracking or tearing.

The blank which as hereinafter stated is in the shape of a converging concavo-convex meniscus having been formed, it is removed while on the spindle from the mold, and before being expanded the skin is allowed to reheat by conduction from the hot interior. In Fig. 2 of the drawings, I have shown the blank as supported during this reheating by its base flange $a$, which is inclosed in a neck ring 98$^E$, the internal plunger 94 having been retracted to a position in which the cavity in the base of the button is in communication with the air space in the spindle. In the mechanism shown, the blank was affixed in this neck ring in the process of formation, (see Fig. 1). By supporting the blank in air by its base flange $a$ (which forms no part of the finished article) the heat lost from the surface to the surrounding air is less than the heat imparted to the surface by conduction from the interior of the blank. From this it follows that by supporting the blank in the manner described for a proper length of time the surface reheats to an extent sufficient to permit swelling without cracking, this being accomplished without so softening the surface as to weaken it beyond the point where it will no longer retain the more fluid interior which in the reheating of the skin becomes less fluid adjacent thereto. During this period of reheating the blank should be retained in substantially the size and shape in which it was molded and this may be accomplished by holding the spindle upright with the blank on the upper end thereof and by rotating the spindle around its longitudinal axis to destroy as much as possible the distorting effects of gravitation, and to aid in the spread of the blank by centrifugal force. This may result in a slight flattening of the button, and changes its shape into a flatter meniscus, which as shown in Fig. 3, may be now a diverging concavo-convex one, but inasmuch as it causes no material increase in the area of the surface thereof it does not call for extension of the skin, as a whole and by properly selecting the contour of the blank as pressed the distention of any portion of its skin may be so reduced as not to be objectionable.

After the surface has been reheated in the manner described, the blank may be expanded.

In Fig. 4, the spindle which in the preceding figures has been erect has been turned to a horizontal position, and a puff of air has been injected into the blank to slightly swell the same. During the position shown in these figures (except that of Fig. 1) the spindle is in rotation around its longitudinal axis.

In Figs. 5 and 6, the spindle is shown fully inverted, in which position the blank elongates by gravity.

In Fig. 7, the blank is being blown, and Fig. 8 a completed blown blank, is shown ready for removal from the spindle.

As shown more particularly in Figs. 10 and 11 the spindle has a trunnion 29 which is hollow, and which has a circumferential channel 107$^b$ communicating with its hollow interior. The mounting 28 for the trunnion has in registration with the channel an air port 107 between which and an air-pipe 116$^a$ leading to a source of air under pressure, is a needle-valve 118. The air port also communicates with the interior of a piston pump 101 provided with a piston 102. The internal cavity of the trunnion 29 is in tight communication with the interior cavity of sleeve 92, the lower end of which is closed against air-escape. The reciprocating plunger 94 is of such diameter as to permit the passage of air upwardly between it and the internal wall of the sleeve, although the head of the plunger is slightly enlarged over the body portion thereof, and makes a close but not an air tight fit in the upper end of the sleeve 92.

In the position of the blank shown in Figs. 1, 2 and 3, the valve 118 is closed and the piston of the pump 102 is held against motion so that air is neither injected into, nor withdrawn from the system, it being sealed within it by the blank in the position of Figs. 1, 2 and 3.

The showing of Figs. 10 and 11 forms a part of the showing of my aforesaid application, to which reference may be had for a further description of means of operating the parts herein referred to.

The blank as pressed, is shown as comprising a flange $a$, upon the base of a button $b$, the neck ring at its junction with the button being restricted in thickness at $c$. The button itself is circular in horizontal cross section, and its outer wall in vertical cross section has a convex top, united to the base flange by a concave curve. The central cavity is that due to flatter curves similar to those forming the outside surface, but so disposed that a thick top is produced united to the base-flange by portions gradually reducing in thickness, thus producing what may in optical terms be called a converging concavo-convex meniscus, the altitude of which is about equal its diameter. The cavity in the button is of less diameter, however, than inside diameter of the base-flange, whereby the thickness of the walls of the button increase abruptly above the restricted portion $c$. The shoulder thus formed in the inside of the button rests when the latter is erect, on the sleeve 92. The button may be said to be exteriorly in the form of a sphere mounted upon the frustum of a cone. This gives, with the necessary limitation for stability, the maximum mass to the minimum surface.

It will be noted, therefore, that the blank as pressed, comprises two distinct parts viz., the base-flange and the button, at the junction of which is the restricted zone. All of the exterior surface of the button is formed by the hollow cavity of the press plunger 81, and all of the interior surface thereof by the plunger 94. Inasmuch, as in the manufacture of a bulb into an electric lamp, it is the practice to reject the upper portion of the neck of the bulb, (say the portion above the lines A—B Fig. 8) and to only incorporate in the finished lamp, the remaining portion of the bulb as blown (i. e., the portion below such line,) and as (as will be hereinafter explained) the glass in the base-flange is prevented in the subsequent manipulation of the blank from flowing down into the button, it will be seen that when my invention is applied to the manufacture of a bulb for such a lamp, the glass of the blank which forms the portion of the bulb which is to be fabricated into the used portion of lamp, (hereinafter referred to as the used portion of the blank) is that pressed between the continuous walls of the outer and inner plungers, each of which is integral, and without joints which would tend, by localized resistance, to heat conduction, to prevent proper and uniform temperature graduations in the glass shaped thereby. In practice, I further make the neck of the blown bulb of such length that the line A—B is located at a sufficient distance from the base-flange that any stresses set up against the neck ring by the chilling thereof will not be communicated to the used portion of the blank.

In Fig. 12 I have shown the step in the manufacture of a lamp such as is shown in Fig. 13 from the bulb of Fig. 8. As there shown, a mount D is inserted well up within the neck of the bulb and is locally heated as by burners F whereupon the weight of the neck flange draws out the neck of the bulb and seals it to its mount, the lamp resulting from this process being shown in Fig. 13.

Attention is also called to the following:

1. The thickness of blank at the part $c$ is such that the glass at such point is sufficiently chilled by the metal of the mold parts adjacent thereto prior to the inversion of the spindle to prevent the glass in the base-flange running down and mixing with glass in the button during elongation.

2. The mass of glass in the button is predetermined by the mass of the article to be blown (exclusive of its neck ring).

3. That the base of the blank as formed by the base-flange has a diameter as great or greater than the adjacent portion of the finished and used portion (i. e., the neck) of the article to be blown. This tends to stability in the blank while reheating in the position shown in Fig. 2, but if this stability can be otherwise obtained, the diameter of the neck may be made less. It may be thus lessened with a reduction in the mass of glass which is in the button, or with a reduction of the fluidity of the glass (due either to the character of the glass or its temperature) when freed from the pressing mold. The larger the diameter of the base-flange, the less danger of asymmetrical distortion.

4. The shape of the button above described, results in locating adjacent to each portion of the surface thereof, a mass of glass containing the heat units necessary to reheat by conduction the skin on such surface as formed by the press parts. The mass of glass contained in the top of the button is valuable for this purpose, as it has adjacent thereto, the skin on the sides of the button, and on the top thereof, as well as that of the top of the internal cavity.

5. The increased thickness of the button immediately above the restricted zone c, affords a stable base of sufficient rigidity to prevent asymmetrical movement of the button in settling, which therefore settles downwardly by internal flow, so that the glass in the top of the button flows under gravity, radially side-wise, reducing the vertical thickness of the button, and giving a more uniform thickness to its walls, and shaping the blank in form suitable for the subsequent treatment.

6. It will be noted that in assuming the shape shown in Fig. 3, there is a slight increase of surface of the blank, but inasmuch as this takes place very slowly, being due solely to the natural flow of the glass under gravity, it does not rupture the skin nor deform it asymmetrically while it is reheating from the hot inside glass. The reheating of the skin by conduction results in reducing a steep temperature gradient from the surface inward which exists in the blank as it is removed from the press mold.

7. After the glass assumes the form shown in Fig. 3 (in which it has the form of a meniscus), air under pressure is admitted into the central cavity at such a rate as to gradually expand it. During this period, the spindle is horizontal and asymmetrical distortion is prevented by rotating the spindle.

Having thus described my invention what I claim is:—

1. A hollow-pressed blank for fabrication into a blown article, comprising a button having a base flange thereon, the button having on its exterior a convex top united to the flange by a concave wall, and having interiorly its walls formed of similar curves so disposed that a thick top is produced connected to the base by walls of decreasing thickness.

2. A hollow-pressed blank for fabrication into a blown article, comprising a button having a base flange thereon, the button having exteriorly a convex top united to the flange by a concave wall, and having interiorly its walls formed of similar curves so disposed that a thick top is produced connected to the base by walls of decreasing thickness, the walls immediately above the base flange being of less thickness than elsewhere.

3. The process of preparing a blank for blowing, which consists in pressing a hollow button with a thickened top connected to its base by walls of decreasing thickness, and supporting such blanks with its base down while the skin of the blank reheats by conduction from the interior thereof.

4. The process of manufacturing glass articles which consists in pressing a hollow blank comprising a button having a flange thereon, the button having a thickened top connected to the flange by walls of decreasing thickness supporting the button erect by its flange while its skin reheats by conduction from the interior glass thereof, and then inverting the blank and blowing the same.

5. The process of manufacturing glass articles which consists in pressing a hollow blank comprising a button having a flange thereon, the button having a thickened top connected to the base flange by walls of decreasing thickness, the walls immediately above the base flange being of less thickness than elsewhere, whereby such walls at such point are locally chilled to prevent the flow of glass therefrom, supporting the blank erect by its base flange while the skin of the button reheats, and then inverting the blank and blowing.

6. The process of preparing glass blanks for blowing, which consists in pressing a blank in the shape of a meniscus, and in then supporting the blank by its edges and without expansion until it settles in a meniscus of less altitude.

7. The process of preparing glass blanks for blowing, which consists in pressing the blank in the shape of a converging concavo-convex meniscus, and in then supporting the blank by its edges while it settles in a meniscus of less altitude without expansion.

8. The process of preparing glass blanks for blowing which consists in pressing the blank in the shape of a converging concavo-convex meniscus, and in then supporting the blank by its edges while it settles into a diverging concavo convex meniscus without expansion.

In testimony whereof I hereunto sign my name this 27th day of September, 1915.

ROBERT W. CANFIELD.